US012739187B2

(12) United States Patent
Alpua

(10) Patent No.: US 12,739,187 B2
(45) Date of Patent: Sep. 15, 2026

(54) NETWORK MANAGEMENT

(71) Applicant: Elisa Oyj, Helsinki (FI)

(72) Inventor: Matti Alpua, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 19/138,696

(22) PCT Filed: Dec. 13, 2023

(86) PCT No.: PCT/FI2023/050689
§ 371 (c)(1),
(2) Date: Jun. 13, 2025

(87) PCT Pub. No.: WO2024/126899
PCT Pub. Date: Jun. 20, 2024

(65) Prior Publication Data

US 2026/0032042 A1 Jan. 29, 2026

(30) Foreign Application Priority Data

Dec. 15, 2022 (FI) ..................................... 20226108

(51) Int. Cl.
*H04L 43/16* (2022.01)
*H04L 41/0816* (2022.01)
*H04L 41/0859* (2022.01)

(52) U.S. Cl.
CPC .......... *H04L 43/16* (2013.01); *H04L 41/0816* (2013.01); *H04L 41/0863* (2013.01)

(58) Field of Classification Search
None
See application file for complete search history.

(56) References Cited

U.S. PATENT DOCUMENTS 9,031,571 B2 * 5/2015 Bejerano ............... H04W 24/04 455/457
10,122,578 B1 * 11/2018 Magerramov ...... H04L 41/0813
10,129,760 B2 * 11/2018 Baroudi ................ H04W 16/18
10,162,698 B2 * 12/2018 Mah .................... G06F 11/0703
11,606,732 B1 * 3/2023 Chandrasekaran ... H04W 16/28
2009/0143065 A1 6/2009 Mattila
(Continued)

FOREIGN PATENT DOCUMENTS

CA 3101267 A1 * 1/2020 .......... H04L 41/149
KR 20190110882 A * 10/2019
(Continued)

*Primary Examiner* — Sandarva Khanal
(74) *Attorney, Agent, or Firm* — Laine IP Oy

(57) ABSTRACT

An apparatus is provided comprising at least one processing core and at least one memory storing instructions that, when executed by the at least one processing core, cause the apparatus at least to store plural definitions of geographic areas, each one of the geographic areas enclosing all core network nodes of a single network domain area, determine, for each of the geographic areas, a number of alerting nodes therein, and trigger reverting, or trigger prompting of a user whether to revert, of at least a subset of core network nodes of a first network domain area to prior configurations based on determining that a number of alerting nodes in a geographic area enclosing the core network nodes of the first network domain area exceeds a threshold number.

12 Claims, 7 Drawing Sheets

Storing plural definitions of geographic areas, each geographic area enclosing all core NW nodes of a single network domain area — 610

Determining, for each of the geographic areas, a number of alerting nodes therein — 620

Triggering reverting, or triggering prompting of a user whether to revert, at least a subset of core NW nodes of a 1st NW domain area to prior configurations based on determining that a number of alerting nodes in a geographic area enclosing the core NW nodes of the first network domain area exceeds a threshold number — 630

(56) References Cited

U.S. PATENT DOCUMENTS

| | | | | |
|---|---|---|---|---|
| 2013/0286852 | A1* | 10/2013 | Bowler | H04L 1/00 370/242 |
| 2013/0290791 | A1* | 10/2013 | Basile | H04L 43/00 714/47.1 |
| 2014/0165060 | A1* | 6/2014 | Muller | G06F 9/45558 718/1 |
| 2015/0086736 | A1* | 3/2015 | Dotson | C08J 5/18 428/36.9 |
| 2015/0254969 | A1 | 9/2015 | Bishop et al. | |
| 2015/0365802 | A1* | 12/2015 | Barr | H04W 4/025 455/456.3 |
| 2020/0287793 | A1 | 9/2020 | Buck et al. | |
| 2021/0226840 | A1* | 7/2021 | Karikallio | H04L 41/0604 |
| 2021/0321278 | A1 | 10/2021 | Zeng et al. | |
| 2022/0295393 | A1 | 9/2022 | Puthenpura et al. | |
| 2022/0357943 | A1 | 11/2022 | Kolar et al. | |
| 2023/0366976 | A1* | 11/2023 | Manolakos | G01S 5/0236 |

FOREIGN PATENT DOCUMENTS

| | | | | |
|---|---|---|---|---|
| WO | WO-2013095287 | A1 * | 6/2013 | H04W 4/021 |
| WO | WO-2020153897 | A1 * | 7/2020 | H04W 4/029 |
| WO | WO-2022082144 | A2 * | 4/2022 | |

* cited by examiner 210
201cp 210
220
α
230

Figure 6:
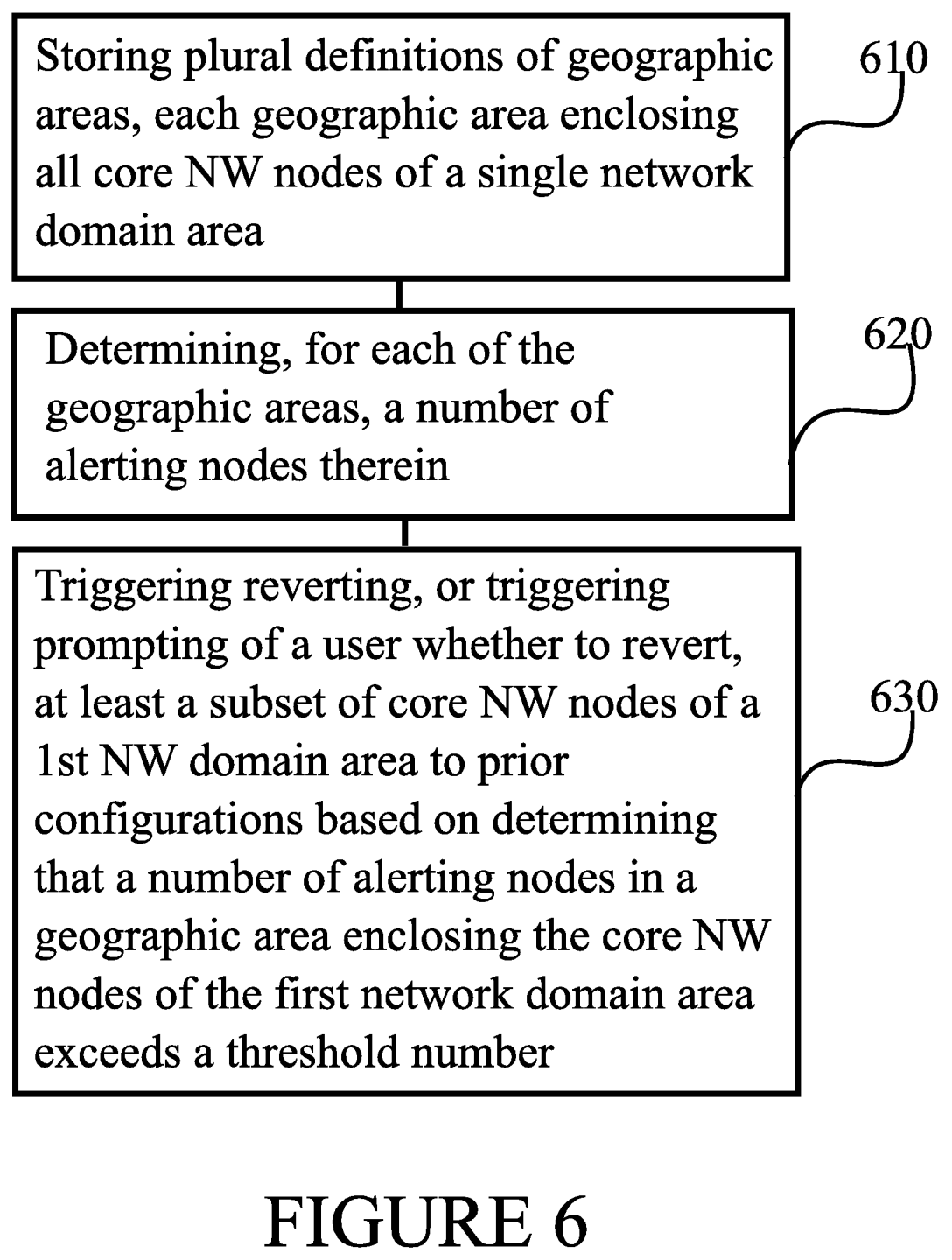

Storing plural definitions of geographic areas, each geographic area enclosing all core NW nodes of a single network domain area

610

Determining, for each of the geographic areas, a number of alerting nodes therein

620

Triggering reverting, or triggering prompting of a user whether to revert, at least a subset of core NW nodes of a 1st NW domain area to prior configurations based on determining that a number of alerting nodes in a geographic area enclosing the core NW nodes of the first network domain area exceeds a threshold number

NETWORK MANAGEMENT

FIELD

The present disclosure relates to management of communication networks.

BACKGROUND

Communication networks may comprise at least core networks and, in some networks, also radio-access networks. For example, cellular communication networks comprise a core network, CN, tasked with functions affecting the network as a whole, while the radio-access network, RAN, enables connectivity to the network to subscribers with user equipments, UEs, furnished with radio communication capabilities. Some networks lack a RAN, being tasked with interconnecting computers and, optionally, other devices in a wired manner, for example.

Core network functions may include, depending on the type of the network, routing of data packets, maintaining user data repositories and subscriber lists, enforcing network policies, providing lawful interception of communications and providing gateways to enable interconnection with further networks.

SUMMARY

According to some aspects, there is provided the subject-matter of the independent claims. Some embodiments are defined in the dependent claims.

According to a first aspect of the present disclosure, there is provided an apparatus comprising at least one processing core and at least one memory storing instructions that, when executed by the at least one processing core, cause the apparatus at least to store plural definitions of geographic areas, each one of the geographic areas enclosing all core network nodes of a single network domain area, determine, for each of the geographic areas, a number of alerting nodes therein, and trigger reverting, or trigger prompting of a user whether to revert, of at least a subset of core network nodes of a first network domain area to prior configurations based on determining that a number of alerting nodes in a geographic area enclosing the core network nodes of the first network domain area exceeds a threshold number.

According to a second aspect of the present disclosure, there is provided a method comprising storing plural definitions of geographic areas, each one of the geographic areas enclosing all core network nodes of a single network domain area, determining, for each of the geographic areas, a number of alerting nodes therein, and triggering reverting, or triggering prompting of a user whether to revert, of at least a subset of core network nodes of a first network domain area to prior configurations based on determining that a number of alerting nodes in a geographic area enclosing the core network nodes of the first network domain area exceeds a threshold number.

According to a third aspect of the present disclosure, there is provided an apparatus comprising means for storing plural definitions of geographic areas, each one of the geographic areas enclosing all core network nodes of a single network domain area, means for determining, for each of the geographic areas, a number of alerting nodes therein, and means for triggering reverting, or for triggering prompting of a user whether to revert, of at least a subset of core network nodes of a first network domain area to prior configurations based on determining that a number of alerting nodes in a geographic area enclosing the core network nodes of the first network domain area exceeds a threshold number.

According to a fourth aspect of the present disclosure, there is provided a non-transitory computer readable medium having stored thereon a set of computer readable instructions that, when executed by at least one processor, cause an apparatus to at least store plural definitions of geographic areas, each one of the geographic areas enclosing all core network nodes of a single network domain area, determine, for each of the geographic areas, a number of alerting nodes therein, and trigger reverting, or triggering prompting of a user whether to revert, of at least a subset of core network nodes of a first network domain area to prior configurations based on determining that a number of alerting nodes in a geographic area enclosing the core network nodes of the first network domain area exceeds a threshold number.

BRIEF DESCRIPTION OF THE DRAWINGS

FIG. 6 is a flow graph of a method in accordance with at least some embodiments.

EMBODIMENTS

Disclosed herein are methods to mitigate the effects of failures or alarms in a network, thereby providing a benefit in terms of enhancing communications reliability provided by the network. Automatic reverting, or automatic prompting whether to revert, to previous device configurations is triggered as a response to determining that a number of network alarms originating from a geographic area spanned by nodes of a network domain area exceeds a threshold. The automatic reverting, or prompting, may further be dependent on whether at least one node, such as a core network node, of the network domain area has been re-configured within a specific time, for example, within the most recent fifteen minutes.

Figure 1:
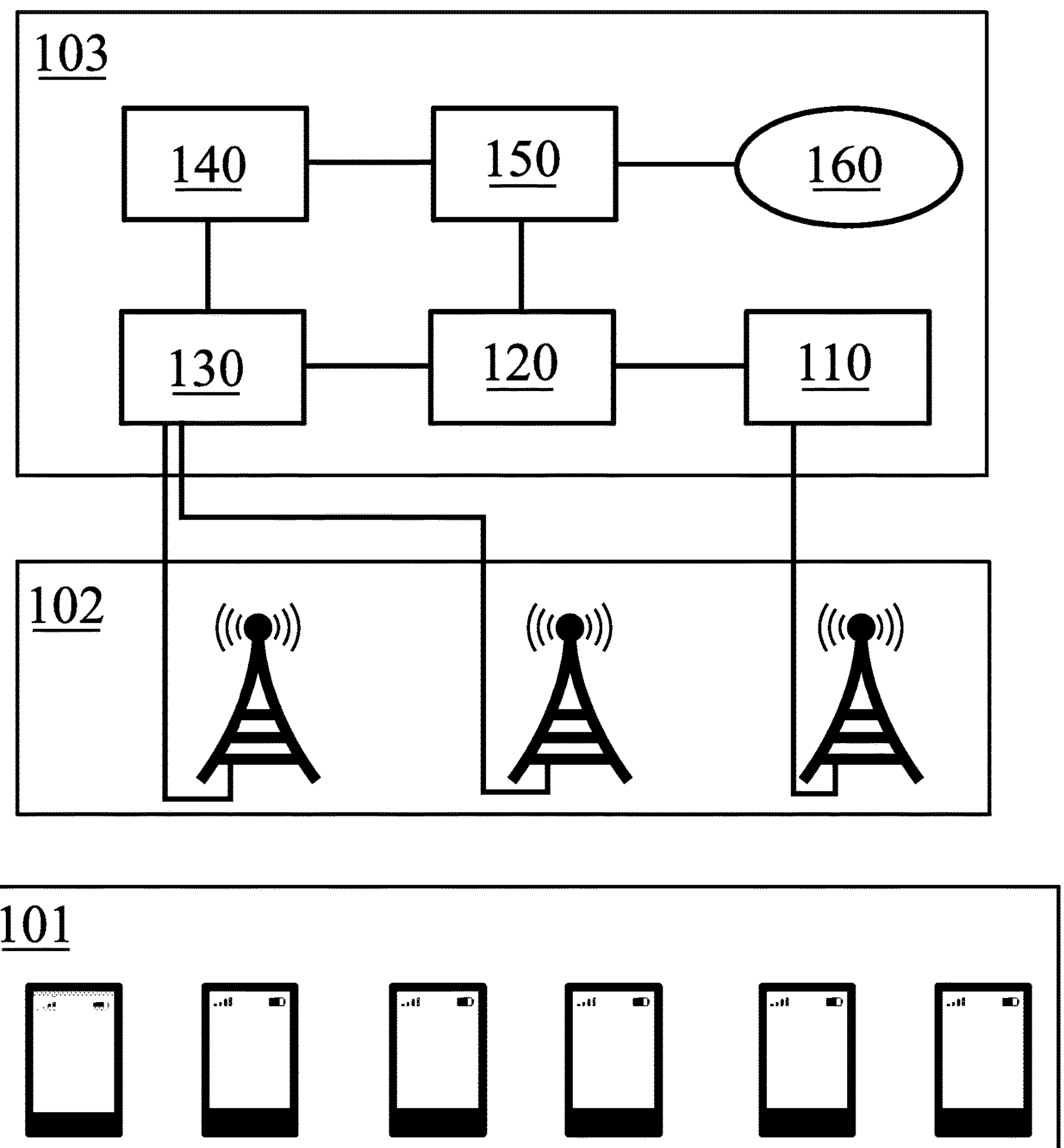
FIG. 1 illustrates an example system in accordance with at least some embodiments.

FIG. 1 illustrates an example system in accordance with at least some embodiments. The example shown in FIG. 1 is a cellular system, but the herein disclosed methods are not limited to being applied in a cellular context. FIG. 1 illustrates a RAN 102, comprising plural base stations, which are configured to operate in accordance with a cellular communication standard, such as long term evolution, LTE, or fifth generation, 5G, also known as New Radio, NR, both as specified by the 3$^{rd}$ generation partnership project, 3GPP. Where a non-cellular system is used, access nodes, such as access points, corresponding to base stations of RAN 102 may be configured in accordance with a non-cellular communication standard such as wireless local area network, WLAN, or worldwide interoperability for microwave access, WiMAX, for example. In some embodiments, RAN 102 is absent, in these cases the network, NW, is a wire-line network based on Ethernet, for example.

Base stations of RAN 102 are coupled with core network nodes of core network 103 via links, which may comprise wire-line connections, for example. A few such links are illustrated in FIG. 1. Core network nodes 110, 120, 130, 140 and 150 may comprise mobility management entities, MME, serving gateways, S-GW, or access and mobility management functions, AMF, for example. The core network may comprise a gateway 160, enabling communication with further networks, via at least one inter-network link. Some aggregate networks may have more than one core network, which are then connected to each other using at least one communication link.

Further, in the illustrated example situation, base stations of RAN 102 are in wireless radio communication with user equipments, UEs 101. Each UE may comprise, for example, a smartphone, feature phone, tablet or laptop computer, Internet-of-Things, IoT, node, smart wearable or a connected car connectivity module, for example. Naturally, separate UEs need not be of a same type.

Core network nodes of core network 103 may be standalone physical nodes, running on a dedicated computing substrate, or they, or at least some of them, may be virtualized network nodes, such that more than one virtualized network node may run on a same physical computing substrate. Virtualized network nodes may be migrated from one physical computing substrate to another, for example to perform load balancing between the computing substrates, or to enable software or hardware updating of the computing substrates. Core network 103 may comprise both standalone physical nodes and virtualized network nodes. In addition to the physical computing substrates, also virtualized and standalone physical nodes may be updated or re-configured. Re-configuring may comprise, for example, changing at least one operating parameter or updating to a different software version. Examples of operating parameters include traffic filters, prioritization rules, routing tables, routing policies and bandwidth caps affecting coverage areas, individual subscribers or subscriber classes.

Each core network node has a set of geographic co-ordinates defining its geographic location on the Earth's surface, in terms of latitude and longitude, for example. Further, each core network node has an assigned domain name, for example a fully qualified domain name, FQDN. The domain name defines the core network node's location in a logical tree topology of the core network. The domain name defines which network domain area the core network node is comprised in. For example, a domain name may comprise fields, for example a hostname field, an area field, a model field and a country field. For example in the case of domain name router1-1-ng.fi, the hostname is "router1", the area is 1, the node model is "ng" and the country "fi", meaning Finland. As is apparent, domain names may be formatted in different manners as well. In some embodiments the area indication is comprised a part of the hostname, and in other embodiments an intermediate domain name level comprised in the domain name is used as the area indication, as in router1-1-ng.fi, where the area indication "1" is present as an intermediate domain name level. In general, an area indication extractable from the domain name identifies the network domain area where the node is, in the logical tree topology. A network node running an alarm management method has access to the geographic co-ordinates and domain names of the core network nodes.

Next will be described a method to determine a geographic area enclosing all core network nodes of a single network domain area. This example method will define the geographic area in terms of a polygon. As an initial step, the geographic co-ordinates of each core network node of the network domain area are collected, and a centre point lat1, lon1 of these is defined as $$lat1 = (\text{max\_latitudes} - \text{min\_latitudes})/2 + \text{min\_latitudes, and}$$

$$lon1 = (\text{max\_longitudes} - \text{min\_longitudes})/2 + \text{min\_longitudes}$$

to obtain the centre point latitude, lat1, and longitude, lon1. In the above, min_latitudes and max_latitudes are the smallest and greatest latitude value among the co-ordinates of the core network nodes of the network domain area, and correspondingly min_longitudes and max_longitudes are the smallest and greatest longitude value among the co-ordinates of the core network nodes of the network domain area.

Distances from the centre point to each core network node, with co-ordinates lat2, lon2 may be determined in kilometres as $$\begin{aligned}&6371 * 2 * \text{atan2}\\&\Big(\sqrt{}\big(\sin\big((\pi*(lat2-lat1)/180)\big)/2\big)*\sin\big((\pi*(lat2-lat1)/180)/2\big)+\\&\cos(\pi*lat1/180)*\cos(\pi*lat2/180)*\sin\big((\pi*lon2-lon1)/180)/2\big)*\sin\\&\big((\pi*(lon2-lon1)/180)\big)/2\big)\big),\ \sqrt{}\big(1-\sin\big((\pi*(lat2-lat1)/180)\big)/2\big)*\\&\sin\big((\pi*(lat2-lat1)/180)/2\big)+\cos(\pi*lat1/180)*\cos(\pi*lat2/180)*\\&\sin\big((\pi*(lon2-lon1)/180)/2\big)*\sin\big((\pi*(lon2-lon1)/180)\big)/2\big)\big)\Big)\end{aligned}$$

where 6371 is the mean radius of the Earth in kilometres. A directional angle from the centre point lat1, lon1 to each core network node at lat2, lon2 may be determined as follows, where the % sign is a modulo operation to normalize a value to between −180 and +180 degrees:

$$\text{If } lat2-lat1>=0 \text{ and } lon2-lon1>=0,\quad \text{atan2}((lat2-lat1),(lon2-lon1)))*180/\pi$$

$$\text{If } lat2-lat1>=0 \text{ and } lon2-lon1<0,\quad \text{atan2}((lat2-lat1),(lon2-lon1)))*180/\pi$$

$$\text{If } lat2-lat1<0 \text{ and } lon2-lon1<0,\quad \text{atan2}((lat2-lat1),(lon2-lon1)))\%(2*\pi)*180//\pi$$

$$\text{If } lat2-lat1<0 \text{ and } lon2-lon1>=0,\ \text{atan2}((lat2-lat1),(lon2-lon1)))\%(2*\pi)*180/\pi$$

Figure 2A:
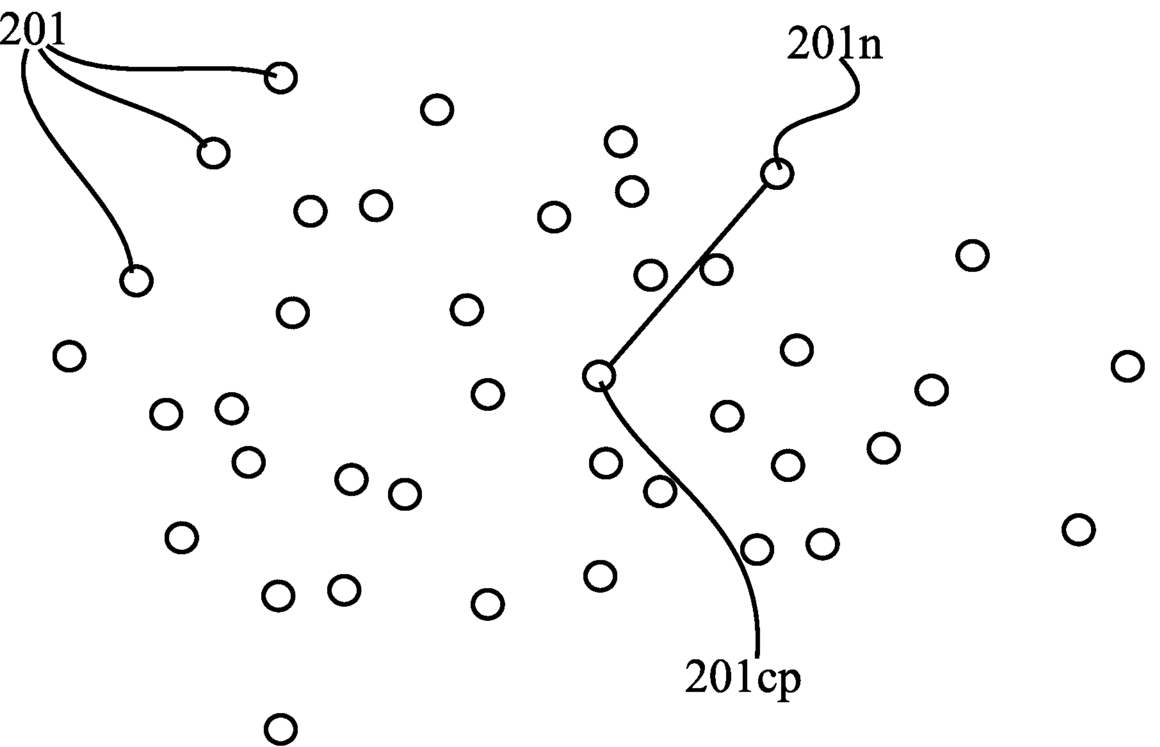
FIG. 2A depicts an example of distance and directional angle.

FIG. 2A depicts an example of distance and directional angle. Core network nodes 201 are those of a specific network domain area, depicted in the figure based on their co-ordinates. The centre point is denoted as 201*cp*. While in this example the centre point corresponds to the location of a core network node, this is in general not the case and the centre point may me at a location where no core network node is present. A straight line connects centre point 201*cp* with a core network node 201*n*, to which, in this example, the distance is 129 km and the directional angle is 52 degrees. The directional angle zero may be selected as in the direction of true east, for example, although the other selections provide an identical result.

Figure 2B:
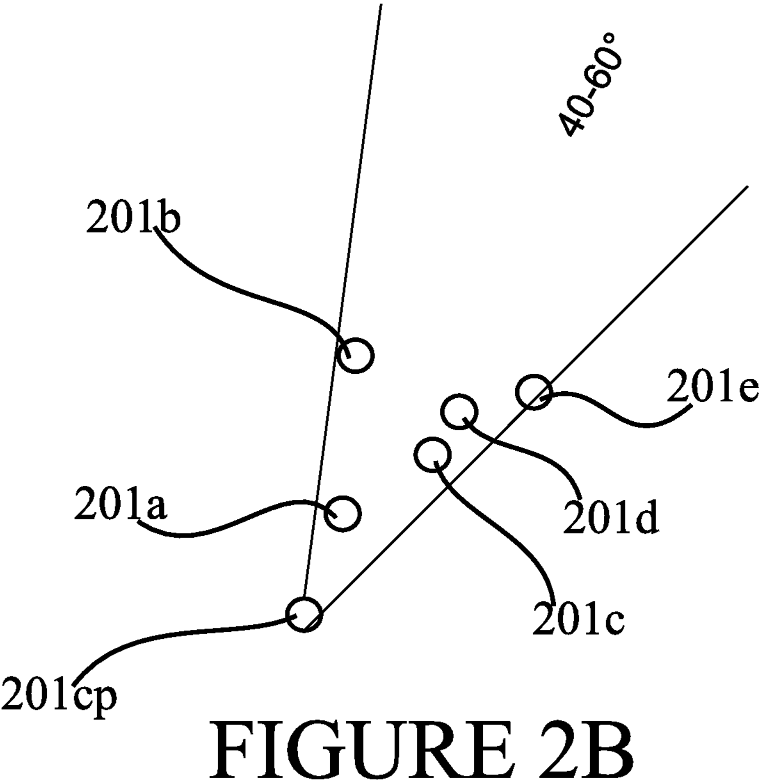
FIG. 2B illustrates selection of perimeter core network nodes.

FIG. 2B illustrates selection of perimeter core network nodes. This may be done in batches of directional angle, in the example of FIG. 2B each batch is 20 degrees, but it may equally be a different batch, such as 15 degrees or 30 degrees. The batch 40-60 degrees is illustrated, and network nodes of the specific network domain area with directional angles falling within this range are depicted in FIG. 2B. Nodes may be selected as perimeter core network nodes, in case 1) the node has the greatest distance for the specific directional angle, when the directional angles are rounded to integers or assigned to sub-brackets of the batch, 2) the distance of the node from the centre point is greater than the expression (maximum distance of the batch–median distance in the batch)/2+median distance in the batch, and 3) a distance of the node, compared to the next and the immediately preceding node, is greater than 80% (or alternatively another cut-off value, e.g. 75% or 90%). All three of the conditions should be met for the node to be selected as a perimeter core network node, in this example method.

In FIG. 2B, the illustrated nodes have the following distances and directional angles:

| Core network node | Distance (km) | Directional angle (deg) |
|---|---|---|
| 201a | 29 | 45 |
| 201b | 129 | 41 |
| 201c | 79 | 49 |
| 201d | 104 | 49 |
| 201e | 131 | 59 |

In this case, nodes 201_b_, 201_d_ and 201_e_ are selected as perimeter nodes. Concerning directional angle 41 degrees, node 201_b_ is selected since it has the largest distance for this angle, and the other conditions listed above are also fulfilled. Concerning directional angle 45, node 201_a_ is not selected since its distance is only 22% of the distance value of the preceding node. Concerning directional angle 49 degrees, node 201_d_ is selected as a perimeter node as it has the largest distance value within the angle, and the other conditions are also fulfilled. Node 201_c_ has a smaller distance than node 201_d_, which is in the same direction from the centre point, thus node 201_c_ is not selected. Finally concerning directional angle 59 degrees, node 201_e_ is selected as a perimeter node as it has the largest distance for the direction, and the other conditions are also fulfilled.

Once the perimeter nodes have been selected, optionally, perimeter points may be obtained by increasing the distance, and maintaining constant the directional angle, of each perimeter node location. In effect, the perimeter is scaled outward from the centre point. A benefit of this scaling is that long distances may be covered by network connections, such as fibre optic connections, and phenomena caused by functioning of a specific node may take place also outside of the perimeter as defined by the set of perimeter node locations. The perimeter points, obtained by the scaling, are further away from the centre point. The scaling may be accomplished e.g. by the following expressions, for a perimeter node with co-ordinates lat2, lon2 and directional angle "angle":

$$\text{dest\_latitude} = \operatorname{asin}\left(\sin\left(lat2 * \pi/180\right) * \cos\left(\text{distance}/6371\right) + \cos\left(lat2 * \pi/180\right) * \sin\left(\text{distance}/6371\right) * \cos\left(\text{angle} * \pi/180\right)\right) * 180/\pi$$

$$\text{dest\_longitude} = \left(\left(lon2 * \pi/180\right) + \operatorname{atan2}\left(\sin\left(\left(\text{angle} * \pi/180\right)\right) * \sin\left(\text{distance}/6371\right) * \cos\left(lat2 * \pi/180\right), \cos\left(\text{distance}/6371\right) - \sin\left(lat2 * \pi/180\right) * \sin\left(\operatorname{asin}\left(\sin\left(lat2 * \pi/180\right) * \cos\left(\text{distance}/6371\right) + \cos\left(lat2 * \pi/180\right) * \sin\left(\text{distance}/6371\right) * \cos\left(\text{angle} * \pi/180\right)\right)\right)\right) + 3 * \pi\right) \% (2 * \pi) - \pi * 180/\pi.$$

Figures 2C, 2D:
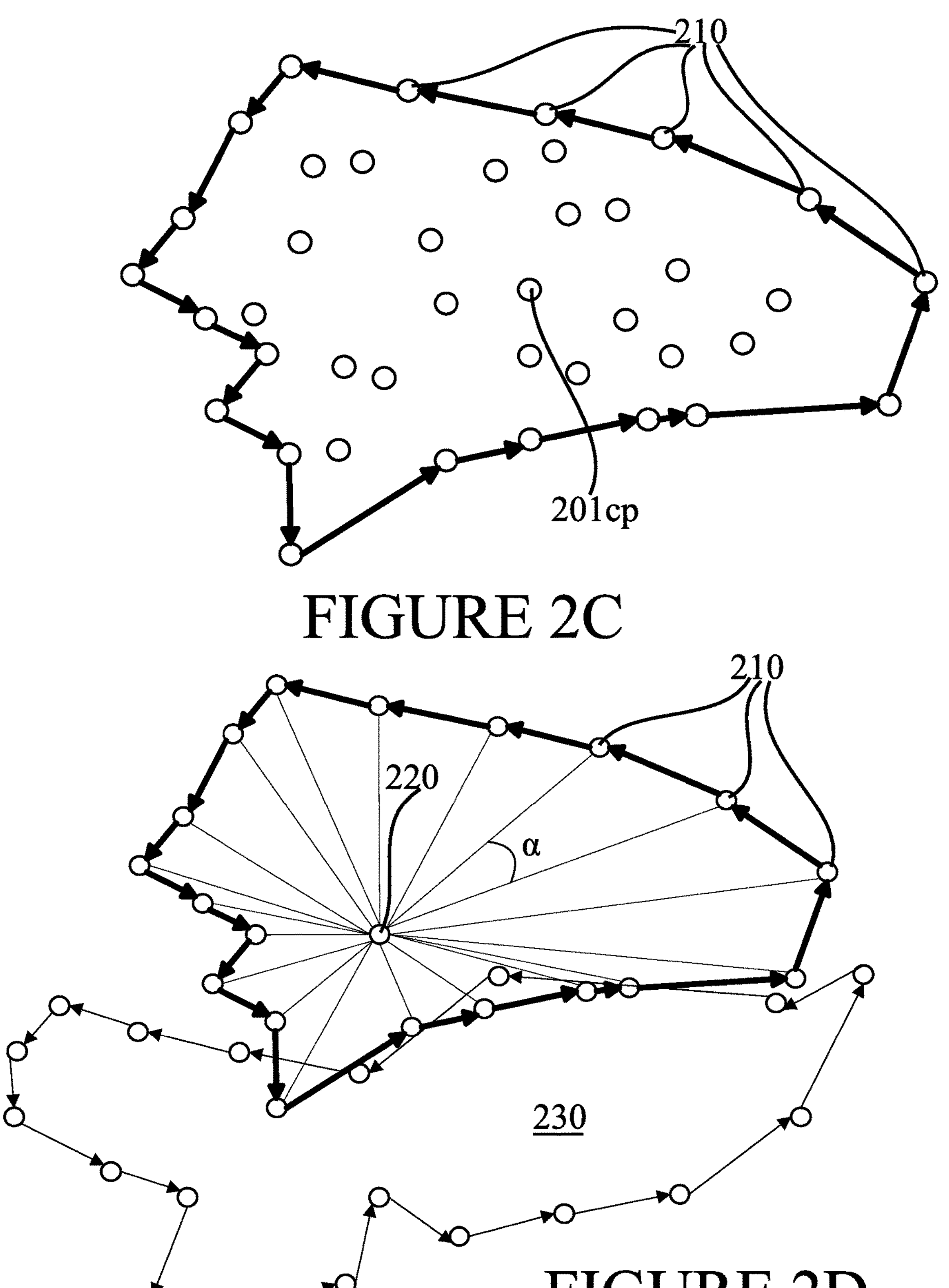
FIG. 2C illustrates an example geographic area definition in terms of a polygon.
FIG. 2D illustrates determination of an alarm as inside a polygonal geographic area.

FIG. 2C illustrates an example geographic area definition in terms of a polygon. Centre point 201_cp_ is present in the figure, corresponding to centre point 201_cp_ in figures described herein above. Perimeter points 210 correspond to the perimeter node locations, if the scaling described above is not performed, or to the results of scaling in case the scaling is performed. The set of perimeter points 210 is the set of vertices of a polygon, the polygon defining the geographic area which encloses the core network nodes of the network domain area. The other circles in the figure are locations of core network nodes of the network domain area for which the geographic area is being defined. The geographic area bounded by the set of perimeter points 210 as vertices represents a geographic footprint of the network domain area, and network phenomena within this area may be considered, or suspected, as being caused by behaviour of core network nodes of the network domain area. For example in the case of cellular communication networks, these networks, NWs, may be large in scope, covering even entire countries within their coverage area. Thus core network nodes in different geographic areas often control RANs of the area, or nearby areas. A polygon limited by the set of perimeter points 210 as vertices encloses all core network nodes of the network domain area used to generate the polygon.

FIG. 2D illustrates determination of an alarm as inside a polygonal geographic area. Perimeter points 210 correspond to those of FIG. 2C, discussed above. A node sending an alarm 220 is depicted in FIG. 2D, as is a second geographic area 230, corresponding to a geographic footprint of a different network domain area than that used to determine the polygonal geographic area bounded by perimeter points 210.

To determine whether the node 220 sending the alarm is inside the polygonal geographic area bounded by perimeter points 210, the following process may be carried out. Firstly, co-ordinates of node 220 may be obtained, and directional angles from the location of node 220 to each perimeter point 210 may be determined. Mathematical expressions for determining a directional angle are provided herein above, although these are not the only suitable mathematical expressions for this purpose. Then the directional angle differences a between consecutive perimeter points 210 may be calculated, and the differences a may be summed up in the clockwise or counter-clockwise direction. In case node 220 is within the polygon defined by perimeter points 210 as vertices, the sum will be a full circle. When using degrees as units of angle, the full circle is 360 degrees.

Of note is that geographic areas corresponding to different network domain areas may overlap, as is the case in FIG. 2D. Consequently, a node 220 sending an alarm may be inside more than one geographic area.

Geographic areas corresponding to geographical footprints of individual domain name areas are useful when responding to alarms, for example, an automated system may be configured to determine a number of active alarms per geographic area, determine if the number of active alarms exceeds a threshold number, and if the number of alarms exceeds the threshold number the system may trigger reverting at least a subset, that is a part but not all of the core network nodes, of the network domain area, to a prior configuration. The prior configuration may be a prior configuration in terms of a software version and/or at least one operating parameter. In some embodiments, instead of automatically triggering the reverting, a user is prompted with a suggestion concerning the reverting, and the reverting is triggered responsive to the user accepting the suggestion.

In some embodiments, the system performing the alarm handling method is configured to only trigger the reverting in those core network nodes of the network domain area for which backup data is available which defines a suitable prior configuration. In some embodiments, the threshold number of alarms need not be active at the same time, rather, these alarms may be received within a set time window of preconfigured length.

In some embodiments, the system the performing the alarm handling method configured to perform the triggering of the reverting, or the triggering of the prompting of the user whether to revert, only in case at least one reconfiguration has been performed in at least one core network node comprised in the network domain area at most a specific preconfigured length of time before the determining that the a number of alerting core network nodes exceeds the threshold number. The preconfigured length of time may be five minutes, fifteen minutes, twenty minutes or an hour, for example. The reason for this is that the alarms, which may form a cascade of alarms, may be caused by the reconfiguration performed in the at least one core network node comprised in the network domain area.

Figure 3:
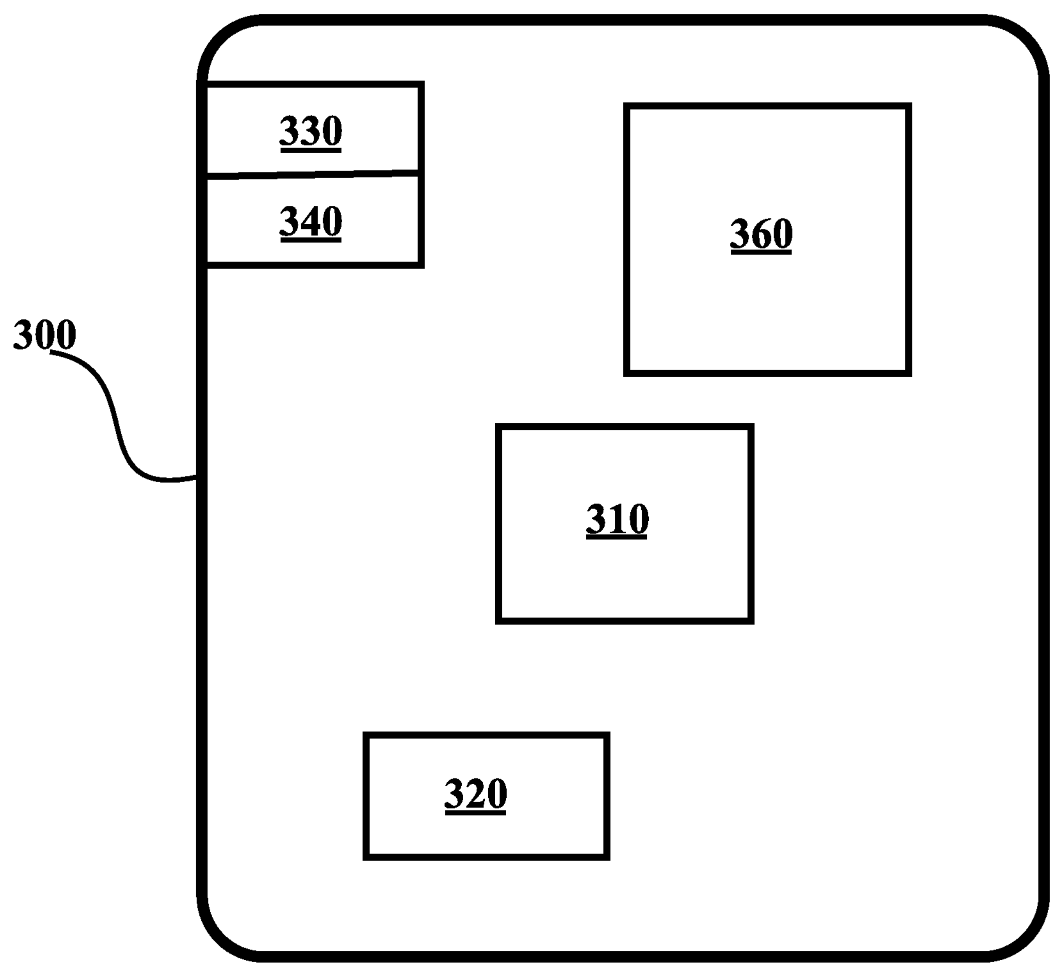
FIG. 3 illustrates an example apparatus capable of supporting at least some embodiments.

FIG. 3 illustrates an example apparatus capable of supporting at least some embodiments. Illustrated is device 300, which may comprise, for example, a node configured to perform the herein disclosed alarm handling method. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one AMD Opteron and/or Intel Xeon processor. Processor 310 may comprise at least one application-specific integrated circuit, ASIC. Processor 310 may comprise at least one field-programmable gate array, FPGA. Processor 310 may be means for performing method steps in device 300, such as storing, determining, triggering and/or prompting. Processor 310 may be configured, at least in part by computer instructions, to perform actions.

As used in this application, the term circuitry covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Ethernet and/or signalling system 7, SS7, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure alarm handling parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
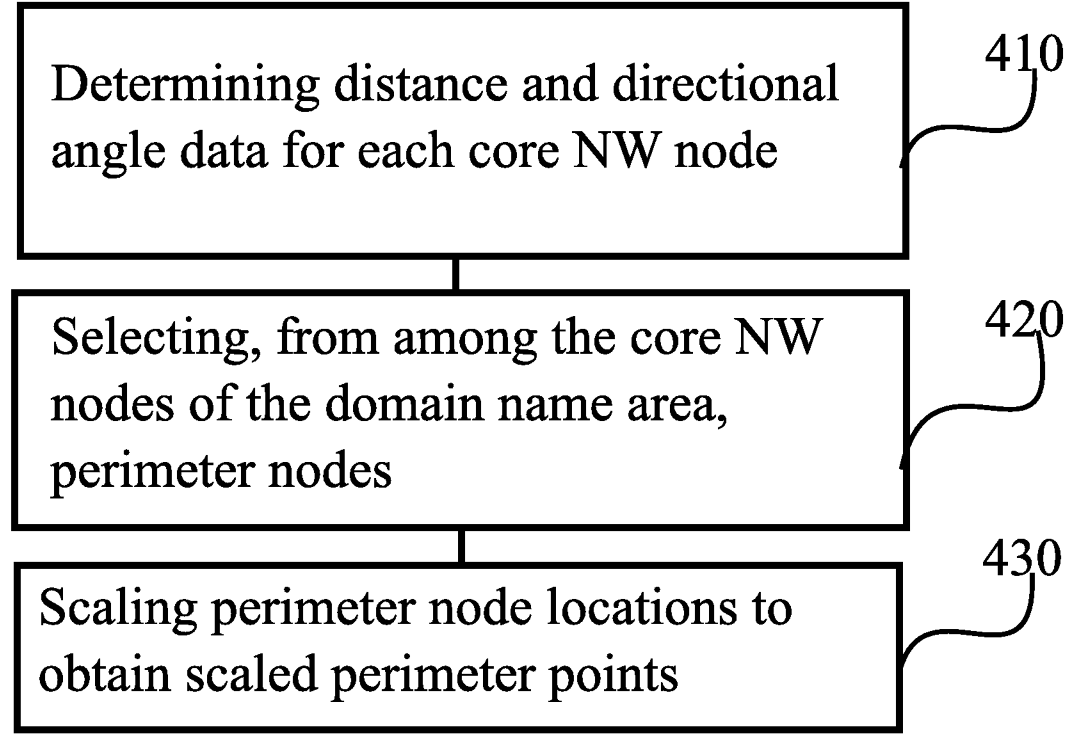
FIG. 4 is a flow graph of a method in accordance with at least some embodiments.

FIG. 4 illustrates a process to determine a polygonal geographic area corresponding to a geographic footprint of a domain name area.

Phase 410 comprises determining, for each core network node of a domain name area, a distance to a centre point and a directional angle relative to the centre point and a selected zero angle direction, as described herein above. Phase 420 comprises selecting, from among the core network nodes of the domain name area, perimeter nodes, as discussed herein above. Phase 430 comprises scaling perimeter node locations to obtain scaled perimeter points. Phase 430 is optional, where it is absent the perimeter node locations serve as perimeter points. Perimeter points are vertices of the polygonal geographic area associated with the domain name area.

Figure 5:
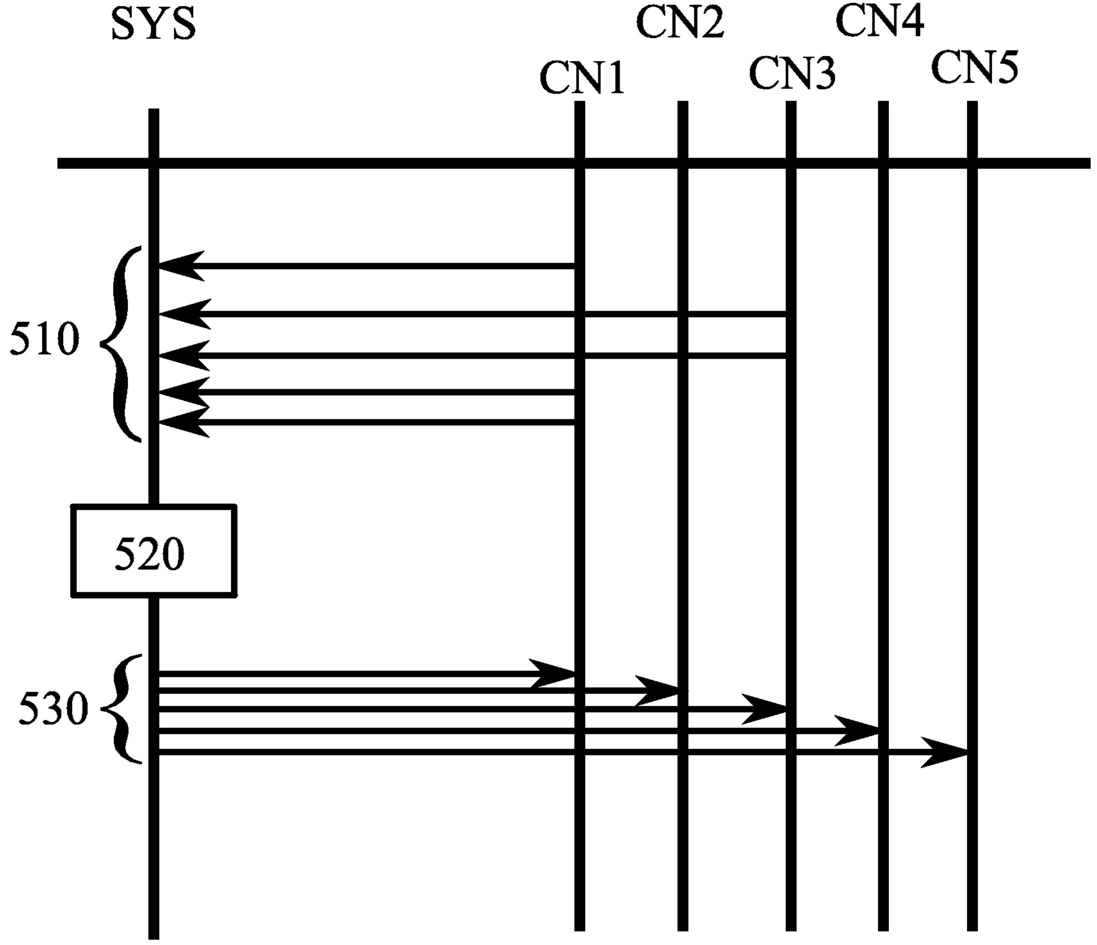
FIG. 5 illustrates signalling in accordance with at least some embodiments.

FIG. 5 illustrates signalling in accordance with at least some embodiments. On the vertical axes are disposed the system running the alarm handling method, SYS, and core network nodes CN1, CN2, CN3, CN4 and CN5 of a same network domain area. The system SYS may comprise a server, for example, or a program running on a server.

In phase 510, the system SYS receives alarms, or information on alarms, which originate within a geographic area corresponding to the network domain area, in other words, it is determined that these alarms originate in a geographic footprint of the network domain area. In general the alarms need not originate in core network nodes of the core network, but may originate in other nodes of the network as well, for example RAN nodes or UE nodes. The system SYS determines, in phase 520, that the number of alarms from the geographic footprint of the network domain area exceeds the threshold number. The alarms of phase 510 may be active at the same time, in other words, the system SYS may be configured, in general, to determine the number of simultaneously active alarms from the geographic footprint of the network domain area exceeds the threshold number. Alternatively to simultaneous alarms, the system SYS may, in phase 520, respond to the threshold number of alarms arriving within a set time window.

Based on the determination of phase 520, the system SYS triggers reverting of at least a part of the core network nodes of the network domain area to a prior configuration, for example in terms of a software version or in terms of at least one parameter.

FIG. 6 is a flow graph of a method in accordance with at least some embodiments. The phases of the illustrated method may be performed in a device configured to perform the herein disclosed alarm handling method, for example.

Phase 610 comprises storing plural definitions of geographic areas, each one of the geographic areas enclosing all core network nodes of a single network domain area. Phase 620 comprises determining, for each of the geographic areas, a number of alerting nodes therein. The alerting nodes may be core network nodes or other nodes of the network where the core network is comprised in. In some embodiments, all the alerting nodes are core network nodes. Finally, phase 630 comprises triggering reverting, or triggering prompting of a user whether to revert, of at least a subset of core network nodes of a first network domain area to prior configurations based on determining that a number of alerting nodes in a geographic area enclosing the core network nodes of the first network domain area exceeds a threshold number.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in network management.

ACRONYMS LIST

3GPP 3$^{rd}$ generation partnership project
5G fifth generation
CN core network
NR new radio
NW network
RAN radio-access network
UE user equipment
WLAN wireless local area network

REFERENCE SIGNS LIST

| | |
|---|---|
| 101 | UEs |
| 102 | RAN |
| 103 | CN |
| 110-150 | CN nodes |
| 160 | Gateway |
| 201, 201n, 201a, 201b, 201c, 201d, 201e | CN nodes |
| 201cp | centre point |
| 210 | perimeter points |
| 220 | alerting node |
| 130 | other geographic area |
| 300-360 | structure of the device of FIG. 3 |
| 410-430 | phases of the method of FIG. 4 |
| 510-530 | phases of the process of FIG. 5 |
| 610-630 | phases of the method of FIG. 6 |

The invention claimed is:

1. An apparatus comprising at least one processing core and at least one memory storing instructions that, when executed by the at least one processing core, cause the apparatus at least to:

store plural definitions of geographic areas, each one of the geographic areas enclosing all core network nodes of a single network domain area;

determine a number of alerting nodes in each one of the geographic areas, and trigger reverting, or trigger prompting of a user whether to revert, of at least a subset of core network nodes of a first network domain area to prior configurations based on determining that a number of alerting nodes in a geographic area enclosing the core network nodes of the first network domain area exceeds a threshold number, wherein the definitions of the geographic areas are polygonal, and wherein the apparatus is configured to determine the geographic areas in which a specific alerting node is located by determining directional angles to polygon vertices of the geographic areas, and to determine the specific alerting node as being located in those geographic areas for which inter-vertex differences of the directional angles to the polygon vertices add up to a full circle.

2. The apparatus according to claim 1, wherein the apparatus is configured to perform the triggering of the reverting only in those core network nodes of the first network domain area for which there is backup data which defines a respective prior configuration.

3. The apparatus according to claim 1, wherein the apparatus is further configured to derive the plural definitions of the geographic areas based at least partly on geographic co-ordinates of the core network nodes of respective network domain areas.

4. The apparatus according to claim 3, wherein the apparatus is configured to derive the plural definitions of the geographic areas at least in part by identifying from among the core network nodes of each respective network domain area those that lie among a perimeter of a respective geographic area enclosing the core network nodes of the network domain area.

5. The apparatus according to claim 3, wherein identified core network nodes are located at vertices of a polygon defined by the polygonal definition of the geographic areas, or each located along a straight line connecting a center point of the polygon with a vertex of a polygon.

6. The apparatus according to claim 1, wherein at least two of the plural defined geographic areas overlap, at least in part.

7. The apparatus according to claim 1, wherein the apparatus is configured to perform the triggering of the reverting, or the triggering of the prompting of the user whether to revert, only in case at least one reconfiguration has been performed in at least one core network node comprised in the first network domain area at most a specific preconfigured length of time before the determining that the number of alerting nodes exceeds the threshold number.

8. The apparatus according to claim 1, wherein the apparatus is configured to participate in alarm monitoring in a communications network.

9. A method comprising:

storing plural definitions of geographic areas, each one of the geographic areas enclosing all core network nodes of a single network domain area;

determining a number of alerting nodes in each one of the geographic areas, and triggering reverting, or triggering prompting of a user whether to revert, of at least a subset of core network nodes of a first network domain area to prior configurations based on determining that a number of alerting nodes in a geographic area enclosing the core network nodes of the first network domain area exceeds a threshold number, wherein the definitions of the geographic areas are polygonal, and wherein the method comprises determining the geographic areas in which a specific alerting node is located by determining directional angles to polygon vertices of the geographic areas, and to determine the specific alerting node as being located in those geographic areas for which inter-vertex differences of the directional angles to the polygon vertices add up to a full circle.

10. The method according to claim 9, wherein the triggering of the reverting is performed only in those core network nodes of the first network domain area for which there is backup data which defines a respective prior configuration.

11. The method according to claim 9, further comprising deriving the plural definitions of the geographic areas based at least partly on geographic co-ordinates of the core network nodes of respective network domain areas.

12. A non-transitory computer readable medium having stored thereon a set of computer readable instructions that, when executed by at least one processor, cause an apparatus to at least:

store plural definitions of geographic areas, each one of the geographic areas enclosing all core network nodes of a single network domain area;

determine a number of alerting nodes in each one of the geographic areas, and trigger reverting, or triggering prompting of a user whether to revert, of at least a subset of core network nodes of a first network domain area to prior configurations based on determining that a number of alerting nodes in a geographic area enclosing the core network nodes of the first network domain area exceeds a threshold number, wherein the definitions of the geographic areas are polygonal, and wherein the set of computer readable instructions, when executed by the at least one processor, cause the apparatus to determine the geographic areas in which a specific alerting node is located by determining directional angles to polygon vertices of the geographic areas, and to determine the specific alerting node as being located in those geographic areas for which inter-vertex differences of the directional angles to the polygon vertices add up to a full circle.

* * * * *